United States Patent Office 3,339,449
Patented Sept. 5, 1967

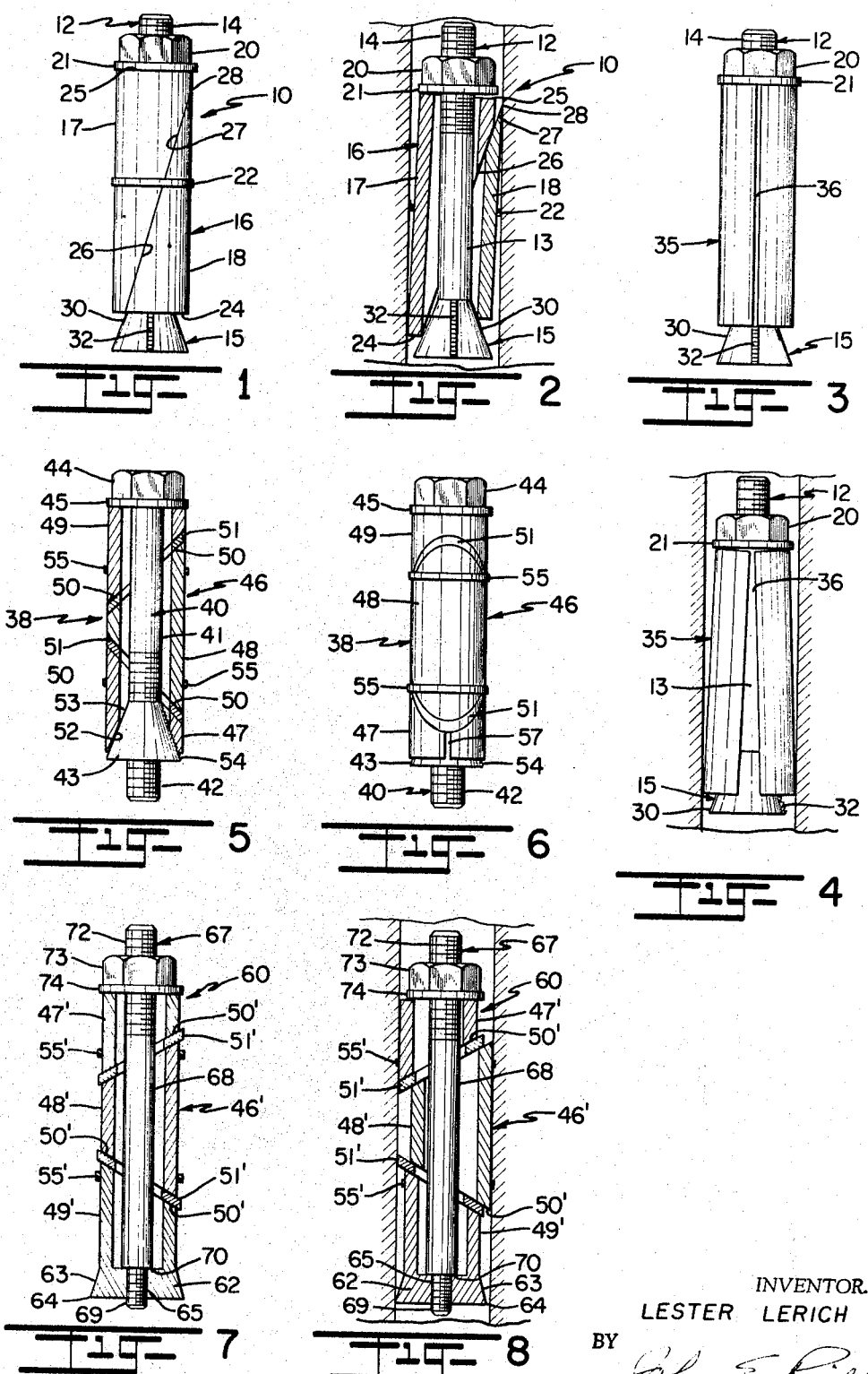

3,339,449
ANCHOR BOLT WITH EXPANSION SLEEVE
Lester Lerich, 30 Morningside Drive,
Lakewood, Colo. 80215
Filed Jan. 27, 1965, Ser. No. 428,470
6 Claims. (Cl. 85—75)

This invention relates to expansion bolts, and more particularly relates to anchor bolts characterized by having expansion sleeves which are selectively movable under axial compression to wedge the bolts in anchored relation within a blind hole or recess formed in rock, concrete or masonry and other like materials.

The present invention is directed to an improvement to anchor bolts of the type set forth and described in the patent to D. P. Roesler, No. 2,918,840. Broadly, anchor bolts of the type described therein are characterized by a bolt portion having outer concentric sleeve sections together with movable abutments or compression members positioned at opposite ends of the sleeve sections. Upon insertion into a hole, the outer compression member is manipulated to effect tightening or compression of the sleeve sections between the compression members and resultant circumferential movement into wedging engagement with the wall of the recess. Since the inner end compression member is not accessible once positioned in the hole, it is important that it be securely fixed against rotation with respect to the outer end compression member in order to undergo axial compressive movement against the inner end of the sleeve sections; or in other words will not merely follow the rotation of either the outer compression member or bolt portion as the outer compression member is being tightened. Accordingly, the present invention is directed to an improved form of anchor bolt assembly specifically incorporating improved end compression members for compressing and anchoring the bolt in place in a blind hole. In this relation, the end compression members of the present invention are thought to be especially effective with the type of anchor bolt assemblies set forth and described in Patent No. 2,918,840 although they are readily conformable for use wih similar types of anchor bolt assemblies as will be described hereinafter in more detail.

Accordingly, it is a principal and foremost object of the present invention to provide for a novel and improved anchor bolt assembly which is adapted for use in a blind hole and which is capable of undergoing circumferential expansion into wedging engagement within the hole by axial compression from either end of the assembly in a positive and dependable manner.

It is a further object of the present invention to provide in combination with an expansion sleeve on an anchor bolt for an improved end compression member which is movable into positive locking relation against the sleeve while being axially movable to compress the sleeve into wedging engagement within an opening or recess.

It is a further object of the present invention to provide for a novel and improved anchor bolt assembly which is so constructed and arranged as to undergo combined circumferential expansion and outward sliding movement into anchored relation within a blind hole or recess in response to axial compression from opposite ends of the sleeve.

The above and other objects, advantages and features of the present invention will become more readily understood and appreciated from a consideration of the following detailed description when taken together with the accompanying drawings, in which:

FIGURE 1 is an elevational view of one form of anchor bolt assembly, in accordance with the present invention.

FIGURE 2 is a view partially in section of the anchor bolt shown in FIGURE 1 and illustrating the bolt in anchored relation within a blind hole.

FIGURE 3 is an elevational view of a modified form of anchor bolt assembly in accordance with the present invention.

FIGURE 4 is a view of the modified form of anchor bolt assembly of FIGURE 2 shown in expanded relation.

FIGURE 5 is a front view of another modified form of the present invention with portions thereof being illustrated in section.

FIGURE 6 is a side elevational view of the form of anchor bolt shown in FIGURE 5.

FIGURE 7 is a view partially in section of still another modified form of anchor bolt assembly in accordance with the present invention; and FIGURE 8 is a view partially in section illustrating the form of anchor bolt assembly shown in FIGURE 7 in anchored relation within a blind hole.

Referring in detail to the drawings, there is shown by way of illustrative example in FIGURES 1 and 2 an anchor bolt 10 consisting of a bolt portion 12 having an elongated cylindrical shank 13, an outer threaded end 14 and an inner end compression member in the form of an enlarged conical head 15 defining an inward divergent extension from the inner end of the shank 13. An expansion sleeve is designated at 16 and is comprised of a pair of complementary tubular wedging sections 17 and 18 assembled in outer spaced concentric relation to the shank portion 13. An outer end compression member is defined by a hex head nut 20 threaded on the outer end of the bolt portion 12 with a washer 21 interpositioned between the nut 20 and sleeve 16. It will be noted that the wedging sections are temporarily held in end-to-end, aligned relation by means of a retainer band 22; and in assembled relation the wedging sections together define flat inner and outer end surfaces 24 and 25 abutting the inner head 15 and outer washer 21 respectively of the compression members.

Preferably, the wedging sections 17 and 18 are formed by splitting the sleeve 16 along an inclined angle to form complementary end faces 26 and 27 extending from the inner surface of the wedging section 17 through the opposite side of the sleeve adjacent to the outer end surface 25 at which point the end face 27 terminates in a relatively sharp edge portion 28.

In turn, the conical head portion 15 is provided with an external tapered surface 30 in facing relation to the sleeve 16 and is tapered at an angle parallel to and aligned along one side with the end faces 26 and 27. Additionally, the tapered surface 30 is provided with an anti-slip ridge portion 32 which is made up of a series of outwardly projecting ridges of limited width and at longitudinally spaced intervals along the surface. In a manner to be described the ridge portion 32 will establish positive locking engagement with the inner end of the sleeve to prevent relative rotation or turning between the bolt portion and sleeve in compressing the sleeve into wedging engagement with the wall of the opening.

In use, the wedging sections are assembled between the inner conical end 15 and washer 21 with the retainer band 22 holding the wedging sections in aligned relation between the end compression members as here defined by the outer nut 20 and washer 21 at the outer end of the bolt portion, and the conical head 15 at the inner end.

The bolt assembly is inserted into a hole or recess as illustrated in FIGURE 2; and to position the assembly in anchored relation therein, the outer nut 20 is rotated inwardly to force the washer 21 against the outer end surface of the sleeve which in turn will force the sleeve into abutting relation with the inner conical head 15. Upon engaging the head, the anti-slip ridge portion will prevent turning of the bolt portion as the nut 20 is rotated and under continued tightening will cause the wedge section 17 to expand outwardly along the tapered surface 30 while forcing the opposite wedging section 18 to slide outwardly along the end face 26 with the edge portion 28 moving into wedging engagement with the wall of the opening at a point diametrically opposed to the lower expanded end surface of the wedging section 17. During rotation of the nut 20 it is important to note that the inner end of the head 15 may be tilted into engagement with the wall of the opening to prevent rotation of the bolt portion 12 as the nut is rotated and tightened against the outer end of the sleeve.

The bolt assembly and specifically the expansion sleeve is dimensioned in accordance with hole size and in general such that the spacing between the external surface of the sleeve and the hole diameter is less than the spacing between the inner surface of the sleeve and shank portion 13. In this way, the sleeve may undergo circumferential expansion to the extent necessary to insure wedging engagement against the wall of the hole. Nevertheless, it will be evident that in the form of invention shown in FIGURES 1 and 2 the wedging section 17 is capable of outward lateral movement for a distance greater than the spacing between that section and the shank 13, and its extent of circumferential expansion will be determined more by the diameter of the conical head portion 15. Similarly, the wedging section 18 is not limited in degree of movement by the spacing between that section and the shank 13 but will be capable of undergoing circumferential expansion under the urging of the conical head to the extent necessary to firmly engage the wall of the opening and in cooperation with the wedging section 17 to hold the bolt assembly securely in place.

The bolt portion 12 as illustrated in FIGURES 1 and 2 may also be utilized in cooperation with modified forms of expansion sleeves, such as for example, the expansion sleeve 35 illustrated in FIGURES 3 and 4. Again, the bolt portion has a conical head 15 at the inner end of the shank with a nut 20 and washer 21 carried at the outer threaded end of the shank portion. The expansion sleeve 35 is positioned therebetween and is in the form of a tubular member having a longitudinal parting line defined by a groove 36 extending the length of the sleeve. Thus, upon axial compression of the sleeve from opposite ends, under the urging of the nut 20 and conical head 15, the sleeve will undergo circumferential expansion along the tapered surface 30 of the head portion 15 into wedging engagement with the wall of the hole. Again the ridge portion 32 on the conical head will lock in place against the inner end surface of the sleeve to prevent rotation of the bolt portion as the nut 20 is tightened down against the outer end surface of the sleeve; and as best seen from FIGURE 4, the expansion sleeve will undergo outward circumferential expansion or bending primarily along the lower end of the sleeve, the degree of which will largely depend on the size of the inner conical head 15.

In still another modified form of invention as shown in FIGURES 5 and 6, bolt assembly 38 consists of a bolt portion 40 having an elongated shank 41 with an inner threaded end 42 for threaded disposition of conical nut 43 thereon. In turn, the outer end of the shank 41 has an enlarged end portion in the form of a hex head 44 as an integral part of the shank portion, and a separate washer 45 is seated against the undersurface of the head 44. Thus, the outer compression member is integrally formed with the bolt portion whereas the inner compression member is adjustable along the inner threaded end of the bolt portion in response to rotation, or turning, of the bolt portion. An expansion sleeve 46 is assembled between the inner conical nut member 43 and the outer head 44 and washer 45, the sleeve being comprised of a series of tubular wedging sections 47, 48 and 49 having angular end faces 50 which are aligned at acute, complementary wedging angles and being separated by bearing plates 51. Accordingly, the expansion sleeve is specifically of the type described in detail in the hereinbefore referred to Roesler Patent No. 2,918,840; however, it will be seen that the innermost wedge section 47 has beveled inner end surface 52 in facing relation to an external tapered surface 53 on the nut member 43. Again, the nut 43 is provided with an anti-slip ridge 54 engageable with the end surface 52 so as to lock firmly against the inner wedge section 47 upon tightening of the bolt portion 40 thereby locking the wedge section against rotation and preventing rotative movement or shifting between the wedge sections as they are compressed together.

In use, the wedging sections are assembled between the nut 43 and outer hex head 44, and are held in aligned, end-to-end relation by a suitable retainer band 55. When inserted into an opening and upon inward rotation of the hex head 44, the inner threaded end of the shank will be advanced through the nut member 43 causing the nut to be drawn against the inner wedging section 47 to compress the wedging sections and to cause them to slide and tilt away from axial alignment with one another into anchored relation with the wall of the opening.

In order to provide for combined circumferential expansion of the sleeve into wedging engagement, the inner wedge section 47 may be provided with a longitudinal groove 57 from the inner end surface 52 to the end face 50. In this way, the inner wedging section 47 will be expanded circumferentially by the generally wedge-shaped nut 43 as the latter is drawn under axial compression against the inner end surface 52 of the wedging section 47. It will be further apparent in the modified forms shown in FIGURES 5 and 6 that in place of the outer hex head 44 a slotted or counter-sunk type head may be employed and may further be utilized with or without a washer to bear against the outer end surface of the expansion sleeve. Of course the washer 45 will cooperate with the inner nut 43 to minimize any tendency of the wedging sections to rotate upon rotation of the outer head 44 and shank 41. In this relation, the nut 43 is dimensioned to project outwardly for a sufficient distance to permit shifting or tilting of its inner terminal end into engagement with the wall of the opening to prevent its rotation as the bolt assembly is tightened. Accordingly, it will function in the same manner as the inner head member 15 shown in FIGURES 1 to 4.

Another embodiment of the present invention is illustrated in FIGURES 7 and 8 wherein a bolt assembly 60 again employs an expansion sleeve 46' comprised of a series of wedging sections 47', 48' and 49' with angled end faces 50' separated by annular bearing plates 51' in the manner illustrated in FIGURES 5 and 6. However, the wedging sections are proportioned differently in that the intermediate wedging section 48' is elongated with respect to the inner and outer wedging sections 47' and 49'. In addition, the inner wedging section 47' includes an integrally formed end compression member 62 diverging outwardly from the external surface of the wedging section to provide an external tapered surface 63, the latter terminating in a relatively sharp outer peripheral edge 64. The end compression member 62 also has a central threaded bore 65 which is centered on the longitudinal axis of the expansion sleeve to be controlled in movement by a modified form of bolt portion 67.

The bolt portion 67 includes an elongated shank 68 having an inner reduced threaded end portion 69 for threaded insertion through the bore 65 until shoulder 70 abuts the end compression member and in this way to secure the bolt in fixed relation to the compresion member and wedging section 47'. To tighten the bolt assembly, the bolt portion 67 has an outer threaded end 72 for a hex head nut 73 with a separate washer 74 being interpositioned between the nut 73 and outer end surface of the wedging section 49'.

In use, the inner threaded end 69 of the bolt portion 67 is advanced through the inner end compression member 62, and the outer nut 73 is tightened firmly against the outer end of the wedging section 49' to prevent relative rotation between the sections 47', 48' and 49' upon insertion into the hole. Once inserted, the nut 63 is further tightened while initially holding the outer terminal edge 64 in frictional engagement against the wall of the hole to prevent turning of the bolt 67 and wedging sections as the nut is rotated. As the intermediate section 48' is then forced outwardly into engagement with the wall as shown in FIGURE 8 the bolt assembly will straighten itself in the hole and be restrained against further turning as the wedging sections are compressed to firmly anchor the bolt assembly in place. In the relation shown it will be noted that as the intermediate wedging section 48' is forced laterally in one direction the outer wedging section 49' is wedged in the opposite direction against the opposite side of the hole with the outer terminal edge 64 of the inner compression member bearing firmly against the wall. Accordingly, the inner end compression member 62 again will cooperate with the wedging sections both to compress and to wedge the bolt firmly in anchored relation within the hole.

In FIGURES 7 and 8, the inner end compression member 62 will function in much the same manner as the compression members 15 and 43 illustrated in FIGURES 1 to 6 to effect positive locking engagement with the expansion sleeve, while at the same time serving as a means of frictional engagement with the wall of the opening to prevent rotation both of the inner compression member and expansion sleeve as the bolt assembly is tightened. Thus, the inner end compression member cooperates in an improved manner with the outer end compression member to exert the necessary axial compression upon the expansion sleeve to urge the latter into anchored relation against the wall of the opening. The inner compression member further may be utilized to advantage to circumferentially expand the inner end of the expansion sleeve, for instance as described with reference to the forms illustrated in FIGURES 3 to 6. Moreover, it will be apparent that the expansion sleeve illustrated in the different forms of invention are interchangeable and for instance the expansion sleeve 16 shown in FIGURES 1 and 2 may be effectively utilized in combination with the bolt portion 40 and compression members shown in FIGURES 5 and 6. It is therefore to be understood that various other modifications and changes may be made in the alternate forms of the present invention as herein described without departing from the spirit and scope of the present invention as defined by the following claims and reasonable equivalents thereof.

What is claimed is:

1. An anchor bolt comprising a bolt portion, an expansion sleeve disposed in outer concentric relation on said bolt portion, said expansion sleeve being defined by a pair of tubular wedging sections having adjacent end faces inclined at complementary wedging angles with the end faces intersecting the inner end surface of said expansion sleeve so as to form a circumferential interruption at the inner end of said sleeve whereby said tubular wedging section may be circumferentially expanded, a pair of outer and inner end compression members arranged in axially spaced relation to said bolt portion with said expansion sleeve being disposed between said end compression members, said end compression members being axially movable in relation to one another against opposite ends of said expansion sleeve in response to tightening of said outer end compression member, and said inner end compression member being dimensioned to circumferentially expand said expansion sleeve and simultaneously to cause relative sliding movement between the end faces of said wedging sections.

2. An anchor bolt according to claim 1, said inner end compression member having an external tapered surface arranged in facing relation to the inner end surface of said expansion sleeve and a ridge portion on the tapered surface to lockingly engage the inner end of said expansion sleeve, said inner end compression member diverging outwardly in a circumferential direction to at least the external surface of said bolt portion and terminating in an outer relatively sharp edge.

3. An anchor bolt for disposition in anchored relation within a blind hole comprising a bolt portion, a tubular wedging member disposed in outer concentric relation on said bolt portion including a flat inner end surface, said wedging member being divided along an acute angle to the axis of said wedging member to define a pair of wedging sections having beveled end faces intersecting the inner end surface of the wedging member so as to define a circumferential interruption at the inner end of the wedging member whereby said wedging sections may be circumferentially expanded, means retaining said wedging sections in assembled relation over said bolt portion, an outer end compression member on said bolt portion engageable with the outer flat end surface of the wedging member, an inner end compression member forming an inwardly divergent integral extension of the inner end of said bolt portion and having an external tapered surface inclining at an angle parallel to the angle between the beveled end faces on said wedging sections, and means on the external tapered surface of said nut being engageable with the inner end of said wedging member to lock said wedging member against rotation upon inward rotation of said outer end compression member whereby to expand one of said wedging sections outwardly along the external tapered surface of said nut and simultaneously to slide the other of said wedging sections outwardly along the beveled end face of the wedging sections.

4. An anchor bolt comprising a bolt portion, an expansion sleeve disposed in outer concentric relation on said bolt portion, said expansion sleeve being defined by a plurality of tubular wedging sections having adjacent end faces inclined at complementary wedging angles to one another including an inner wedging section being formed with a parting line in the wall of said wedging section intersecting the inner end surface of said sleeve so as to form a circumferential interruption at the end of said sleeve whereby said inner wedging section may be circumferentially expanded, a pair of outer and inner end compression members arranged in axially spaced relation on said bolt portion with said expansion sleeve being disposed between said end compression members, said end compression members being axially movable in relation to one another against opposite ends of said expansion sleeve in response to tightening of said outer end compression member, and said inner end compression member being dimensioned to circumferentially expand said expansion sleeve and simultaneously to cause relative sliding movement between the end faces of said wedging sections.

5. An anchor bolt according to claim 4, said expansion sleeve being further provided with annular washers interposed between adjacent end faces of said wedging sections.

6. An anchor bolt according to claim 4, said inner wedging section being further provided with an inner bevelled end surface, and said inner end compression member being in the form of an inwardly divergent conical portion having an external tapered surface complementary to the inner beveled end surface of said inner wedging section and being engageable with the inner end of said wedging section to lock said inner wedging section against rotation upon tightening of said outer end compression member.

References Cited

UNITED STATES PATENTS

| | | | |
|---|---|---|---|
| 525,222 | 8/1894 | Levering | 85—75 |
| 570,786 | 11/1896 | Church | 85—67 |
| 691,921 | 1/1902 | Wheeler | 85—67 |
| 1,037,277 | 9/1912 | Martin | 85—79 |
| 1,316,640 | 9/1919 | Parsons | 85—79 |
| 2,177,138 | 10/1939 | Hollander | 85—79 |
| 2,918,840 | 12/1959 | Roesler | 85—69 |

FOREIGN PATENTS

| | | |
|---|---|---|
| 910,631 | 2/1946 | France. |
| 1,304,001 | 8/1962 | France. |
| 1,322,067 | 2/1963 | France. |
| 1,348,531 | 12/1963 | France. |
| 4,779 | 2/1897 | Great Britain. |
| 546,984 | 8/1942 | Great Britain. |
| 756,524 | 9/1956 | Great Britain. |

CARL W. TOMLIN, *Primary Examiner*.

M. PARSONS, Jr., *Assistant Examiner*.